US006798782B1

(12) United States Patent
Caronni et al.

(10) Patent No.: US 6,798,782 B1
(45) Date of Patent: Sep. 28, 2004

(54) TRULY ANONYMOUS COMMUNICATIONS USING SUPERNETS, WITH THE PROVISION OF TOPOLOGY HIDING

(75) Inventors: Germano Caronni, Palo Alto, CA (US); Amit Gupta, Fremont, CA (US); Sandeep Kumar, Santa Clara, CA (US); Tom R. Markson, San Mateo, CA (US); Christoph L. Schuba, Mountain View, CA (US); Glenn C. Scott, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/457,917

(22) Filed: Dec. 10, 1999

(51) Int. Cl.$^7$ .......................... H04L 12/28; H04L 12/56
(52) U.S. Cl. ....................................... 370/409; 370/475
(58) Field of Search ................................. 370/475, 235, 370/312, 389, 390, 432, 401, 409, 397, 399, 395.54; 709/225–228, 201, 202, 245; 713/200, 201, 202

(56) References Cited

U.S. PATENT DOCUMENTS

| | | | |
|---|---|---|---|
| 4,825,354 A | | 4/1989 | Agrawal et al. |
| 5,220,604 A | | 6/1993 | Gasser et al. |
| 5,331,637 A | | 7/1994 | Francis et al. |
| 5,335,346 A | | 8/1994 | Fabbio |
| 5,519,833 A | | 5/1996 | Agranat et al. |
| 5,570,366 A | | 10/1996 | Baker et al. |
| 5,572,528 A | | 11/1996 | Shuen |
| 5,623,601 A | | 4/1997 | Vu |
| 5,696,763 A | | 12/1997 | Gang, Jr. |
| 5,720,035 A | | 2/1998 | Allegre et al. |
| 5,732,137 A | * | 3/1998 | Aziz ........................... 713/155 |

(List continued on next page.)

FOREIGN PATENT DOCUMENTS

| | | |
|---|---|---|
| EP | 0 702 477 A2 | 3/1996 |
| EP | 0 813 327 A2 | 12/1997 |
| EP | 0 887 981 A2 | 12/1998 |
| EP | 0 702 477 A3 | 7/1999 |
| WO | WO 89/08887 | 9/1989 |
| WO | WO 97/48210 | 12/1997 |
| WO | WO 98/18269 | 4/1998 |
| WO | WO 98/32301 | 7/1998 |
| WO | WO 99/11019 | 3/1999 |
| WO | WO 99/38081 | 7/1999 |

OTHER PUBLICATIONS

Iona Technologies, "Introduction to OrbixOTM", IONA Technologies PLC, Jun. 1999, PLC XP002178409, Online, retrieved from the Internet: <URL: http://www.iona.com/docs/manuals/orbixotm/30/pdf/Orbixotm30_intro.pdf>, retrieved Sep. 25, 2001.

(List continued on next page.)

Primary Examiner—Ajit Patel
Assistant Examiner—Chirag Shah
(74) Attorney, Agent, or Firm—Finnegan, Henderson, Farabow, Garrett & Dunner, L.L.P.

(57) ABSTRACT

Methods and systems consistent with the present invention provide a Supernet, a private network constructed out of components from a public-network infrastructure. Supernet nodes can be located on virtually any device in the public network (e.g., the Internet), and both their communication and utilization of resources occur in a secure manner by providing for anonymous communications within the network through addressing. As a result, the users of a Supernet benefit from their network infrastructure being maintained for them as part of the public-network infrastructure, while the level of security they receive is similar to that of a private network. Additionally, the nodes of the Supernet are not geographically restricted in that they can be connected to the Supernet from virtually any portal to the Internet in the world.

24 Claims, 10 Drawing Sheets

U.S. PATENT DOCUMENTS

| | | | |
|---|---|---|---|
| 5,835,723 A | | 11/1998 | Andrews et al. |
| 5,856,974 A | | 1/1999 | Gervais et al. |
| 5,884,024 A | * | 3/1999 | Lim et al. .................... 713/201 |
| 5,931,947 A | | 8/1999 | Burns et al. |
| 5,933,420 A | | 8/1999 | Jaszewski et al. |
| 5,960,177 A | | 9/1999 | Tanno |
| 5,987,506 A | | 11/1999 | Carter et al. |
| 5,999,531 A | | 12/1999 | Ferolito et al. |
| 6,061,346 A | | 5/2000 | Nordman |
| 6,061,796 A | | 5/2000 | Chen et al. |
| 6,078,586 A | | 6/2000 | Dugan et al. |
| 6,128,298 A | | 10/2000 | Wootton et al. |
| 6,130,892 A | | 10/2000 | Short et al. |
| 6,158,011 A | | 12/2000 | Chen et al. |
| 6,219,694 B1 | | 4/2001 | Lazaridis et al. |
| 6,226,751 B1 | * | 5/2001 | Arrow et al. ............... 713/201 |
| 6,236,652 B1 | | 5/2001 | Preston et al. |
| 6,279,029 B1 | | 8/2001 | Sampat et al. |
| 6,307,837 B1 | | 10/2001 | Ichikawa et al. |
| 6,308,282 B1 | | 10/2001 | Huang et al. |
| 6,327,252 B1 | | 12/2001 | Silton et al. |
| 6,330,671 B1 | | 12/2001 | Aziz |
| 6,333,918 B1 | | 12/2001 | Hummel |
| 6,335,926 B1 | | 1/2002 | Silton et al. |
| 6,374,298 B2 | | 4/2002 | Tanno |
| 6,377,997 B1 | | 4/2002 | Hayden |
| 6,393,484 B1 | * | 5/2002 | Massarani ................... 709/227 |
| 6,415,323 B1 | | 7/2002 | McCanne et al. |
| 6,452,925 B1 | | 9/2002 | Sistanizadeh et al. |
| 6,487,600 B1 | | 11/2002 | Lynch |
| 6,505,255 B1 | | 1/2003 | Akatsu et al. |
| 6,507,908 B1 | * | 1/2003 | Caronni ...................... 713/153 |
| 6,515,974 B1 | * | 2/2003 | Inoue et al. ................ 370/331 |
| 6,557,037 B1 | | 4/2003 | Provino |
| 6,567,405 B1 | | 5/2003 | Borella et al. |
| 6,615,349 B1 | | 9/2003 | Hair |

OTHER PUBLICATIONS

Iona Technologies, "Orbix C++ Administrator's Guide", Iona Technologies PLC, Feb. 1999, XP002178410, Online, retrived from the internet <URL: http://www.iona.com/docs/manuals/orbix/301/pdf/Orbix301_admin.pdf>, retrieved Sep. 25, 2001.

Iona Technologies, "OrbixNames Programmer's and Administrator's Guide", Iona Technologies PLC, XP002178411, Online, , retrieved from the internet: <URL: http://www.iona/com/docs/manuals/orbix/301/orbix-names301_prog.pdf>, retrieved Sep. 25, 2001.

Deng, R.H. et al., "Integrating Security in Corba Based Object Architectures", Proceedings of the Symposium on Security and Privacy, IEEE Comp. Soc. Press, U.S. vo. SYMP. 16, May 8, 1995, pp. 50–61.

Microsoft Corporation, "DCOM Technical Overview", Online, Nov. 1996, XP002178408, retrieved from the Internet: <URL:http://msdn.microsoft.com/library/default.asp?URL=/library/backgrnd/html/msdn_d comtec.htm>, retrieved Sep. 25, 2001.

Chung, P.E. et al., "DCOM and CORBA Side by Side, Step by Step, and Layer by Layer", C Plus Plus Report, SIGS-Publications, Inc., New York, New York, vol. 10, No. 1, Jan. 1998, pp. 18–29, 40.

Keith Edwards, "Core Jini", Jun. 1999, Prentice Hall PTR, XP002178476, pp. 64–76, 147, 244.

Perkins, C.E., "Mobile Networking Through Mobile IP", IEEE Internet Computing, vol. 2, No. 1, Jan.–Feb. 1998, pp. 1–12.

Lima, de H.M. et al., "An Effective Selective Repeat ARQ Strategy for High Speed Point–to–Multipoint Communication", IEEE 47$^{th}$, vol. 37, conf. 47, Nov. 18, 1996, pp. 1059–1063.

Armitage, G.J., "IP Multicasting Over ATM Networks", IEEE Journal on Selected Areas in Communications, vol. 15, No. 3, Apr. 1, 1997, pp. 445–457.

Forman, George H., et al., "The Challenges of Mobile Computing", Mar. 9, 1994, University of Washington Computer Science & Engineering, pp. 8–9.

Laborde, D., "Understanding And Implementing Effective VPNs", Computer Technology Review, Westworld Production Co., Los Angeles, CA, vol. 18, No. 2, Feb. 1, 1998 pp. 12, 14, 16.

Freier, A. O. et al., "The SSL Protocol Version 3.0", Internet Draft, Nov. 18, 1996, pp. Abstract, 1–72.

Gleeson, Heinanen, Armitage, "A Framework for IP Based Virtual Private Networks" Online, retrieved from the Internet: <URL: http://www.alternic.org/drafts/drafts–g–h/draft–gleeson–vpn–framework–00.txt>, retrieved Jun. 27, 2001.

Ricciutti, Mike, "Iona makes CORBA Net friendly" CNET News Com, Mar. 7, 1997, pp. 1–2, XP002178407, Online, retrieved from the Internet: <URL:http://news.cnet.com/news/0,10000,0–1003–200–317147,00.html>, retrieved Sep. 25, 2001.

Stevenson, D. et al., "Design of a key agile cryptographic system for OC–12c rate ATM", IEEE Comput. Soc., Feb. 16, 1995, pp. 17–30.

Perkins, C., "IP Mobility Support", ftp://ftp.isp.edu/in–notes/rfc2002.txt Oct. 1996, p. 1–79.

Perkins, Charles E., "Mobile IP", May 1997, IEEE Communications Magazine, p. 84–86. 91–99.

Fumio Teraoka, "VIP: a Protocol Providing Host Migration Transparency," *Internetworking: Research and Experience*, vol. 4, pp. 195–221 (1993).

Fumio Teraoka et al., "Host Migration Transparency in IP Networks: The VIP Approach," *Computer Communication Review*, pp. 45–65.

Fumio Teraoka et al., "A Network Architecture Providing Host Migration Transparency," *Computer Communication Reviw*, No. 4, pp. 209–220, (Sep. 1991).

Xinhua Zhao et al., "Flexible Network Support for Mobility," *ACM*, pp. 145–155, (1998).

K.C. Chua et al., "On a Linux implementation of mobile IP and its effects on TCP performance," *Computer Communications Review*, No. 22, pp. 568–588, (1999).

Pike, Rob et al., "Plan 9 from Bell Labs", 1995, Lucent Technologies, pp. 1–25.

Waldvogel, Marcel et al., "The VersaKey Framework: Versatile Group Key Management", Sep., 1999, Computer Engineering and Networks Laboratory (TIK) Eth Zürich, Switzerland and Sun Microsystems Inc., Network Security Group, Palo Alto, California, pp. 1–27.

SSH IPSEC Express, White Paper, Version 2.0, Mar., 1999, SSH Communications Security Ltd., pp. 1–23.

Aziz, Ashar et al., "Simple Key–Management for Internet Protocols (SKIP)", http://www.tik.ee.ethz.ch/~skip/SKIP.html, Sep., 1999, pp. 1–19.

Aziz, Ashar et al., "Design and Implementation of SKIP", INET '95 Conference, Jun. 28. 1995, pp. 1–12.

Kent, S. et al., "IP Authentication Header", ftp://ftp.isi,edu/in-notes/rfc2402.txt, Nov., 1998, pp. 1–19.

IBM Technical Disclosure Bulletin, "Virtual Private Networks on Vendor Independent Networks", vol. 35, No. 4A, pp. 326–329, Sep. 1992.

Pakstas, A., "Towards electronic commerce via science park multi-Extranets", Computer Communications 22, pp. 1351–1363, 1999.

V-One Corp., "V-One's SmartGate VPN", No. XP-000785261, Adverisement Data Communications, pp. A5–A6.

Wright, M., "Using Policies for Effective Network Management", International Journal of Network Management 9, No. XP-002116275, pp. 118–125, 1999.

* cited by examiner

TRULY ANONYMOUS COMMUNICATIONS USING SUPERNETS, WITH THE PROVISION OF TOPOLOGY HIDING

RELATED APPLICATIONS

The following identified U.S. patent applications are relied upon and are incorporated by reference in this application.

U.S. patent application Ser. No. 09/458,043, entitled "SYSTEM AND METHOD FOR SEPARATING ADDRESSES FROM THE DELIVERY SCHEME IN A VIRTUAL PRIVATE NETWORK," and filed on the same date herewith.

U.S. patent application Ser. No. 09/457,889, entitled "METHOD AND SYSTEM FOR FACILITATING RELOCATION OF DEVICES ON A NETWORK," and filed on the same date herewith.

U.S. patent application Ser. No. 09/457,916, entitled "SANDBOXING APPLICATIONS IN A PRIVATE NETWORK USING A PUBLIC-NETWORK INFRASTRUCTURE," and filed on the same date herewith.

U.S. patent application Ser. No. 09/457,894, entitled "SECURE ADDRESS RESOLUTION FOR A PRIVATE NETWORK USING A PUBLIC NETWORK INFRASTRUCTURE," and filed on the same date herewith.

U.S. patent application Ser. No. 09/458,020, entitled "DECOUPLING ACCESS CONTROL FROM KEY MANAGEMENT IN A NETWORK," and filed on the same date herewith.

U.S. patent application Ser. No. 09/457,895, entitled "CHANNEL-SPECIFIC FILE SYSTEM VIEWS IN A PRIVATE NETWORK USING A PUBLIC NETWORK INFRASTRUCTURE," and filed on the same date herewith.

U.S. patent application Ser. No. 09/458,040, entitled "PRIVATE NETWORK USING A PUBLIC-NETWORK INFRASTRUCTURE," and filed on the same date herewith.

U.S. patent application Ser. No. 09/457,914, entitled "SYSTEM AND METHOD FOR ENABLING SCALABLE SECURITY IN A VIRTUAL PRIVATE NETWORK," and filed on the same date herewith.

U.S. patent application Ser. No. 09/457,915, entitled "USING MULTICASTING TO PROVIDE ETHERNET-LIKE COMMUNICATION BEHAVIOR TO SELECTED PEERS ON A NETWORK," and filed on the same date herewith.

U.S. patent application Ser. No. 09/457,896, entitled "ANYCASTING IN A PRIVATE NETWORK USING A PUBLIC NETWORK INFRASTRUCTURE," and filed on the same date herewith.

U.S. patent application Ser. No. 09/458,021, entitled "SCALABLE SECURITY ASSOCIATIONS FOR GROUPS FOR USE IN A PRIVATE NETWORK USING A PUBLIC-NETWORK INFRASTRUCTURE," and filed on the same date herewith.

U.S. patent application Ser. No. 09/458,044, entitled "ENABLING SIMULTANEOUS PROVISION OF INFRASTRUCTURE SERVICES," and filed on the same date herewith.

FIELD OF THE INVENTION

The present invention relates generally to data processing systems and, more particularly, to a private network using a public-network infrastructure.

BACKGROUND OF THE INVENTION

As part of their day-to-day business, many organizations require an enterprise network, a private network with lease lines, dedicated channels, and network connectivity devices, such as routers, switches, and bridges. These components, collectively known as the network's "infrastructure," are very expensive and require a staff of information technology personnel to maintain them. This maintenance requirement is burdensome on many organizations whose main business is not related to the data processing industry (e.g., a clothing manufacturer) because they are not well suited to handle such data processing needs.

Another drawback to enterprise networks is that they are geographically restrictive. The term "geographically restrictive" refers to the requirement that if a user is not physically located such that they can plug their device directly into the enterprise network, the user cannot typically utilize it. To alleviate the problem of geographic restrictiveness, virtual private networks have been developed.

Figure 1:
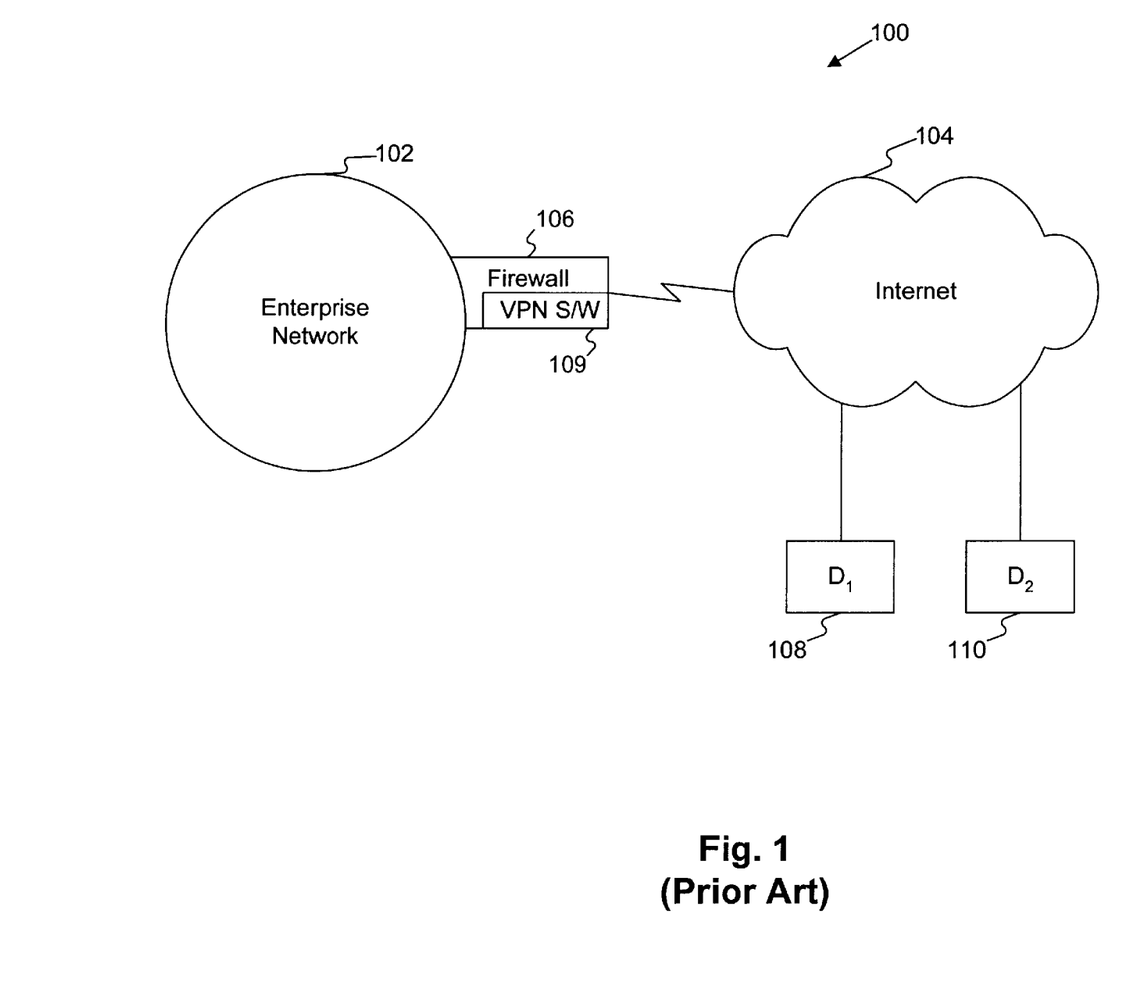
FIG. 1 depicts a conventional virtual private network (VPN) system.

In a virtual private network (VPN), a remote device or network connected to the Internet may connect to the enterprise network through a firewall. This allows the remote device to access resources on the enterprise network even though it may not be located near any component of the enterprise network. For example, FIG. 1 depicts a VPN 100, where enterprise network 102 is connected to the Internet 104 via firewall 106. By using VPN 100, a remote device $D_1$ 108 may communicate with enterprise network 102 via Internet 104 and firewall 106. Thus, $D_1$ 108 may be plugged into an Internet portal virtually anywhere within the world and make use of the resources on enterprise network 102.

Figure 2A:
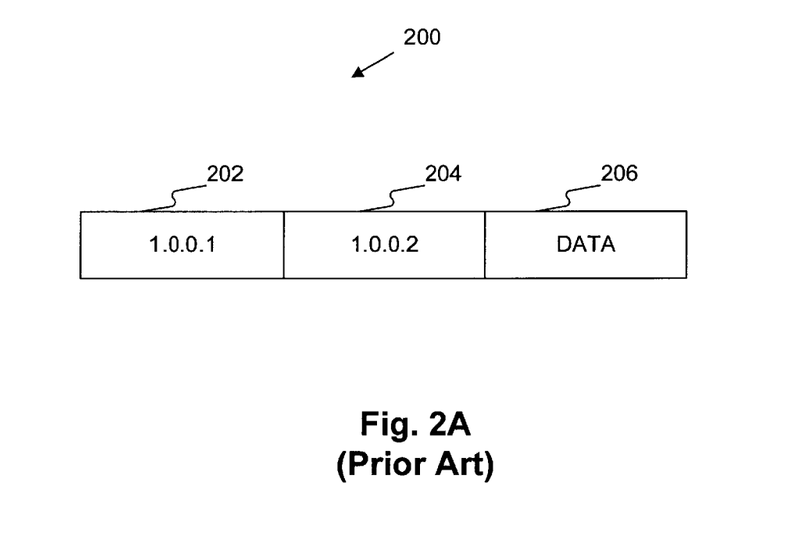
FIG. 2A depicts a conventional network packet.
Figure 2B:
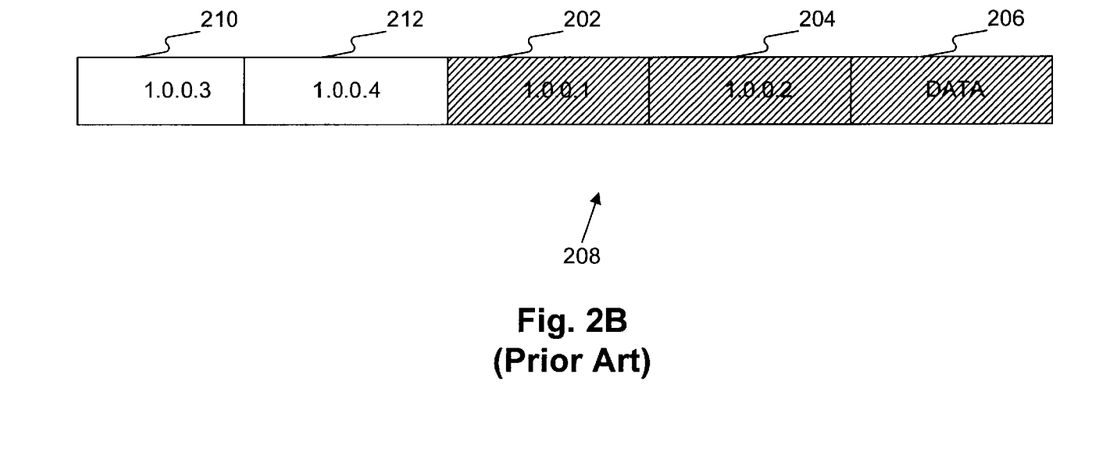
FIG. 2B depicts the packet of FIG. 2A after it has been encrypted in accordance with a conventional tunneling technique.

To perform this functionality, $D_1$ 108 utilizes a technique known as tunneling to ensure that the communication between itself and enterprise network 102 is secure in that it cannot be viewed by an interloper. "Tunneling" refers to encapsulating one packet inside another when packets are transferred between end points (e.g., $D_1$ 108 and VPN software 109 running on firewall 106). The packets may be encrypted at their origin and decrypted at their destination. For example, FIG. 2A depicts a packet 200 with a source Internet protocol (IP) address 202, a destination IP address 204, and data 206. It should be appreciated that packet 200 contains other information not depicted, such as the source and destination port. As shown in FIG. 2B, the tunneling technique forms a new packet 208 out of packet 200 by encrypting it and adding both a new source IP address 210 and a new destination IP address 212. In this manner, the contents of the original packet (i.e., 202, 204, and 206) are not visible to any entity other than the destination. Referring back to FIG. 1, by using tunneling, remote device $D_1$ 108 may communicate and utilize the resources of the enterprise network 102 in a secure manner.

Although VPNs alleviate the problem of geographic restrictiveness, they impose significant processing overhead when two remote devices communicate. For example, if remote device $D_1$ 108 wants to communicate with remote device $D_2$ 110, $D_1$ sends a packet using tunneling to VPN software 109, where the packet is decrypted and then transferred to the enterprise network 102. Then, the enterprise network 102 sends the packet to VPN software 109, where it is encrypted again and transferred to $D_2$. Given this processing overhead, it is burdensome for two remote devices to communicate in a VPN environment. It is therefore desirable to alleviate the need of organizations to maintain their own network infrastructure as well as to improve communication between remote devices.

SUMMARY OF THE INVENTION

Accordingly, systems and methods consistent with the present invention substantially obviate one or more of the problems due to limitations, shortcomings, and disadvantages of the related art by providing for a network that allows secure communications between nodes allowed access to the network through the use of key management.

In accordance with the present invention, as embodied and broadly described herein, a system and method is provided in a public network having a network infrastructure that is used by a private network over which a plurality of nodes communicate, which establishes an address pair for each node of the private network including a virtual address within the private network assigned by an authentication module and a real address indicating a physical location associated with each node; and sends a message from a source node to a destination node including an address pair for the source node such that the real address of the source node is determinable only by an address resolution module and a real identity of the source node is determinable only by the authentication module.

Both the foregoing general description and the following detailed description are exemplary and explanatory only, and merely provide further explanation of the claimed invention.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION

Methods and systems consistent with the present invention provide a "Supernet," which is a private network that uses components from a public-network infrastructure. A Supernet allows an organization to utilize a public-network infrastructure for its enterprise network so that the organization no longer has to maintain a private network infrastructure; instead, the organization may have the infrastructure maintained for them by one or more service providers or other organizations that specialize in such connectivity matters. As such, the burden of maintaining an enterprise network is greatly reduced. Moreover, a Supernet is not geographically restrictive, so a user may plug their device into the Internet from virtually any portal in the world and still be able to use the resources of their private network in a secure and robust manner.

Overview

Figure 3:
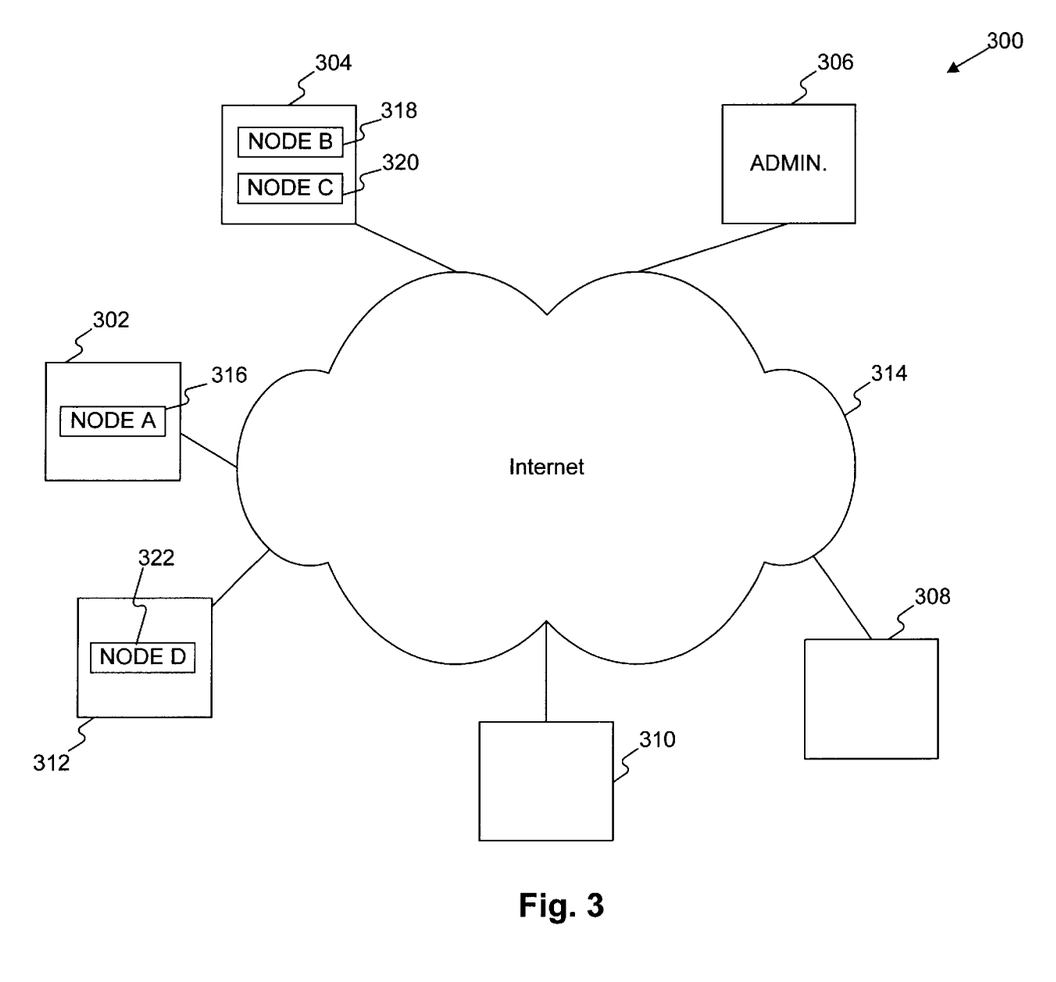
FIG. 3 depicts a data processing system suitable for use with methods and systems consistent with the present invention.

FIG. 3 depicts a data processing system 300 suitable for use with methods and systems consistent with the present invention. Data processing system 300 comprises a number of devices, such as computers 302–312, connected to a public network, such as the Internet 314. A Supernet's infrastructure uses components from the Internet because devices 302, 304, and 312 contain nodes that together form a Supernet and that communicate by using the infrastructure of the Internet. These nodes 316, 318, 320, and 322 are communicative entities (e.g., processes) running within a particular device and are able to communicate among themselves as well as access the resources of the Supernet in a secure manner. When communicating among themselves, the nodes 316, 318, 320, and 322 serve as end points for the communications, and no other processes or devices that are not part of the Supernet are able to communicate with the Supernet's nodes or utilize the Supernet's resources. The Supernet also includes an administrative node 306 to administer to the needs of the Supernet. It should be noted that since the nodes of the Supernet rely on the Internet for connectivity, if the device on which a node is running relocates to another geographic location, the device can be plugged into an Internet portal and the node running on that device can quickly resume the use of the resources of the Supernet. It should also be noted that since a Supernet is layered on top of an existing network, it operates independently of the transport layer. Thus, the nodes of a Supernet may communicate over different transports, such as IP, IPX, X.25, or ATM, as well as different physical layers, such as RF communication, cellular communication, satellite links, or land-based links.

Figure 4:
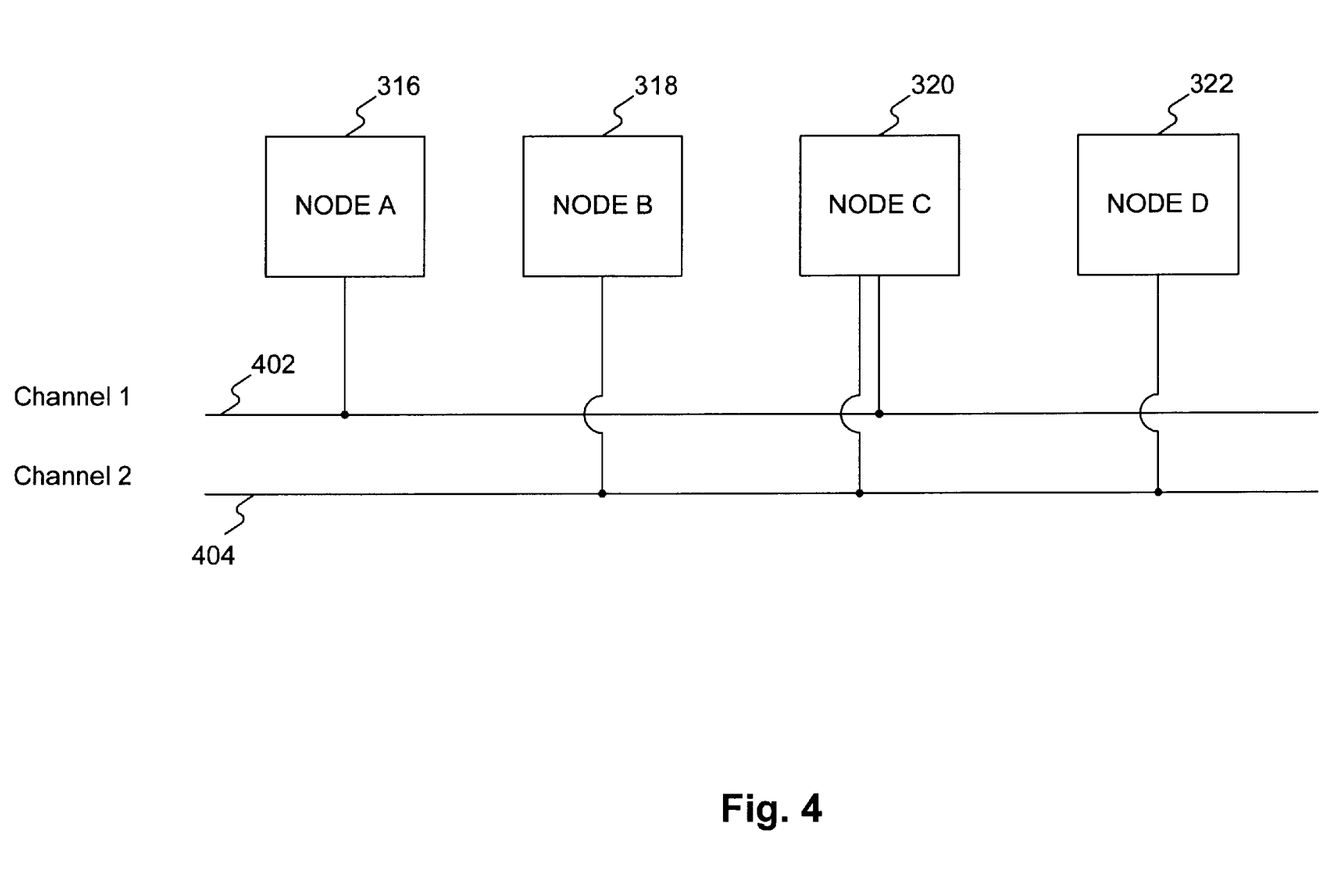
FIG. 4 depicts the nodes depicted in FIG. 3 communicating over multiple channels.

As shown in FIG. 4, a Supernet includes a number of channels that its nodes 316–322 can communicate over. A "channel" refers to a collection of virtual links through the public-network infrastructure that connect the nodes on the channel such that only these nodes can communicate over it. A node on a channel may send a message to another node on that channel, known as a unicast message, or it can send a message to all other nodes on that channel, known as a multicast message. For example, channel 1 402 connects node A 316 and node C 320, and channel 2 404 connects node B 318, node C 320, and node D 322. Each Supernet has any number of preconfigured channels over which the nodes on that channel can communicate. In an alternative embodiment, the channels are dynamically defined.

In addition to communication, the channels may be used to share resources. For example, channel 1 402 may be configured to share a file system as part of node C 320 such that node A 316 can utilize the file system of node C in a secure manner. In this case, node C 320 serves as a file system manager by receiving file system requests (e.g., open, close, read, write, etc.) and by satisfying the requests by manipulating a portion of the secondary storage on its local machine. To maintain security, node C 320 stores the data in an encrypted form so that it is unreadable by others. Such security is important because the secondary storage may not be under the control of the owners of the Supernet, but may instead be leased from a service provider.

Additionally, channel 2 404 may be configured to share the computing resources of node D 322 such that nodes B 318 and C 320 send code to node D for execution. By using channels in this manner, resources on a public network can be shared in a secure manner.

A Supernet provides a number of features to ensure secure and robust communication among its nodes. First, the system provides authentication and admission control so that nodes become members of the Supernet under strict control to prevent unauthorized access. Second, the Supernet provides communication security services so that the sender of a message is authenticated and communication between end points occurs in a secure manner by using encryption. Third, the system provides key management to reduce the possibility of an intruder obtaining an encryption key and penetrating a secure communication session. The system does so by providing one key per channel and by changing the key for a channel whenever a node joins or leaves the channel. Alternatively, the system may use a different security policy.

Fourth, the system provides address translation in a transparent manner. Since the Supernet is a private network constructed from the infrastructure of another network, the Supernet has its own internal addressing scheme, separate from the addressing scheme of the underlying public network. Thus, when a packet from a Supernet node is sent to another Supernet node, it travels through the public network. To do so, the Supernet performs address translation from the internal addressing scheme to the public addressing scheme and vice versa. To reduce the complexity of Supernet nodes, system-level components of the Supernet perform this translation on behalf of the individual nodes so that it is transparent to the nodes. Another benefit of the Supernet's addressing is that it uses an IP-based internal addressing scheme so that preexisting programs require little modification to run within a Supernet.

Lastly, the Supernet provides operating system-level enforcement of node compartmentalization in that an operating system-level component treats a Supernet node running on a device differently than it treats other processes on that device. This component (i.e., a security layer in a protocol stack) recognizes that a Supernet node is part of a Supernet, and therefore, it enforces that all communications to and from this node travel through the security infrastructure of the Supernet such that this node can communicate with other members of the Supernet and that non-members of the Supernet cannot access this node. Additionally, this operating system-level enforcement of node compartmentalization allows more than one Supernet node to run on the same machine, regardless of whether the nodes are from the same Supernet, and allows nodes of other networks to run on the same machine as a Supernet node.

Implementation Details

Figure 5:
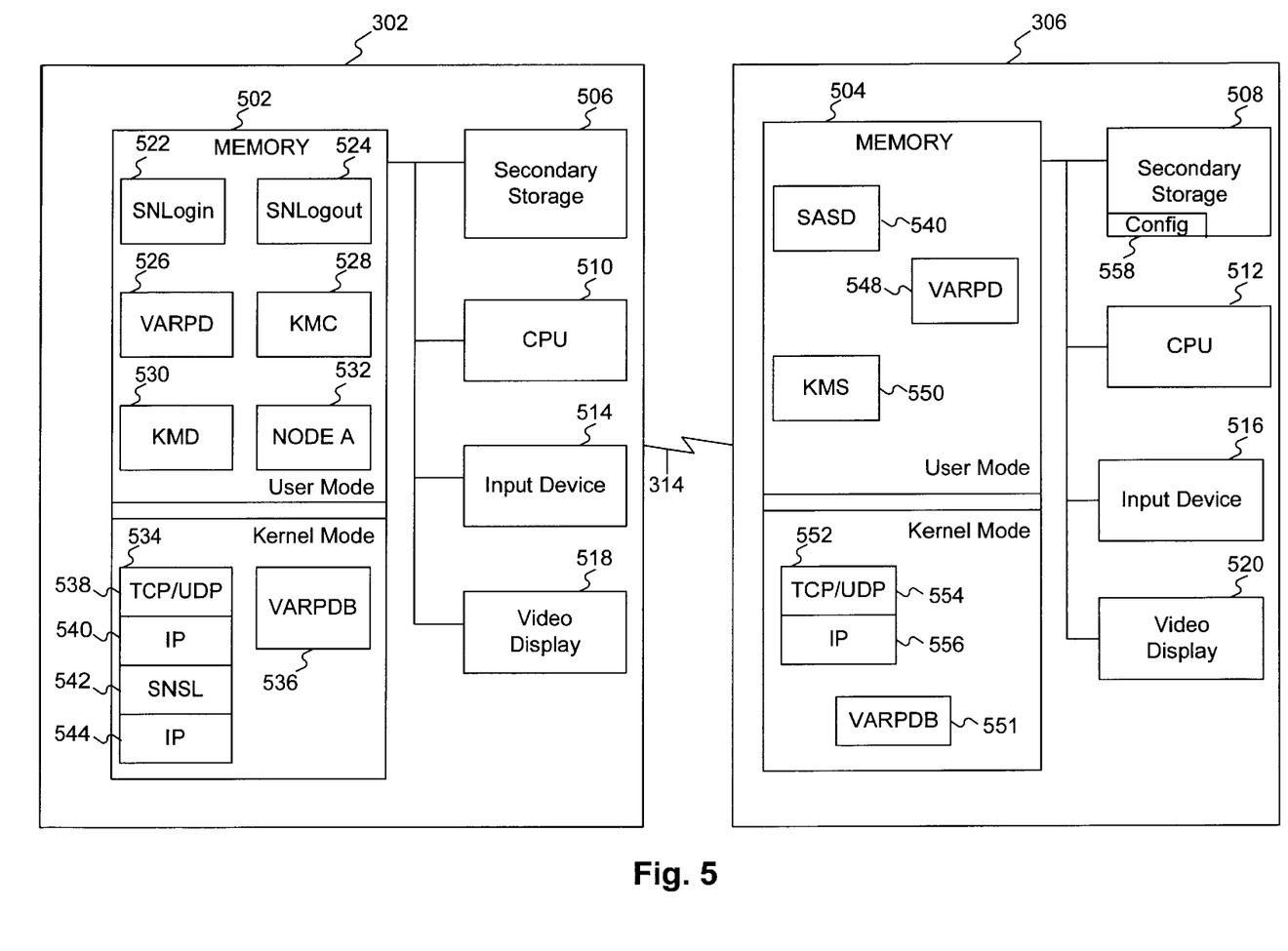
FIG. 5 depicts two devices depicted in FIG. 3 in greater detail.

FIG. 5 depicts administrative machine 306 and device 302 in greater detail, although the other devices 304 and 308–312 may contain similar components. Device 302 and administrative machine 306 communicate via Internet 314. Each device contains similar components, including a memory 502, 504; secondary storage 506, 508; a central processing unit (CPU) 510, 512; an input device 514, 516; and a video display 518, 520. One skilled in the art will appreciate that these devices may contain additional or different components.

Memory 504 of administrative machine 306 includes the SASD process 540, VARPD 548, and KMS 550 all running in user mode. That is, CPU 512 is capable of running in at least two modes: user mode and kernel mode. When CPU 512 executes programs running in user mode, it prevents them from directly manipulating the hardware components, such as video display 518. On the other hand, when CPU 512 executes programs running in kernel mode, it allows them to manipulate the hardware components. Memory 504 also contains a VARPDB 551 and a TCP/IP protocol stack 552 that are executed by CPU 512 running in kernel mode. TCP/IP protocol stack 552 contains a TCP/UDP layer 554 and an IP layer 556, both of which are standard layers well known to those of ordinary skill in the art. Secondary storage 508 contains a configuration file 558 that stores various configuration-related information (described below) for use by SASD 540.

SASD 540 represents a Supernet: there is one instance of an SASD per Supernet, and it both authenticates nodes and authorizes nodes to join the Supernet. VARPD 548 has an associated component, VARPDB 551, into which it stores mappings of the internal Supernet addresses, known as a node IDs, to the network addresses recognized by the public-network infrastructure, known as the real addresses. The "node ID" may include the following: a Supernet ID (e.g., 0×123), reflecting a unique identifier of the Supernet and a virtual address, comprising an IP address (e.g., 10.0.0.1). The "real address" is an IP address (e.g., 10.0.0.2) that is globally unique and meaningful to the public-network infrastructure. In a Supernet, one VARPD runs on each machine, and it may play two roles. First, a VARPD may act as a server by storing all address mappings for a particular Supernet into its associated VARPDB. Second, regardless of its role as a server or not, each VARPD assists in address translation for the nodes on its machine. In this role, the VARPD stores into its associated VARPDB the address mappings for its nodes, and if it needs a mapping that it does not have, it will contact the VARPD that acts as the server for the given Supernet to obtain it.

KMS 550 performs key management by generating a new key every time a node joins a channel and by generating a new key every time a node leaves a channel. There is one KMS per channel in a Supernet.

To configure a Supernet, a system administrator creates a configuration file 558 that is used by SASD 540 when starting or reconfiguring a Supernet. This file may specify: (1) the Supernet name, (2) all of the channels in the Supernet, (3) the nodes that communicate over each channel, (4) the address of the KMS for each channel, (5) the address of the VARPD that acts as the server for the Supernet, (6) the user IDs of the users who are authorized to create Supernet nodes, (7) the authentication mechanism to use for each user of each channel, and (8) the encryption algorithm to use for each channel. Although the configuration information is described as being stored in a configuration file, one skilled in the art will appreciate that this information may be retrieved from other sources, such as databases or interactive configurations.

After the configuration file is created, it is used to start a Supernet. For example, when starting a Supernet, the system administrator first starts SASD, which reads the configuration information stored in the configuration file. Then, the administrator starts the VARPD on the administrator's machine, indicating that it will act as the server for the Supernet and also starts the KMS process. After this processing has completed, the Supernet is ready for nodes to join it.

Memory 502 of device 302 contains SNlogin script 522, SNlogout script 524, VARPD 526, KMC 528, KMD 530, and node A 522, all running in user mode. Memory 502 also includes TCP/IP protocol stack 534 and VARPDB 536 running in kernel mode.

SNlogin 522 is a script used for logging into a Supernet. Successfully executing this script results in a Unix shell from which programs (e.g., node A 522) can be started to run within the Supernet context, such that address translation and security encapsulation is performed transparently for them and all they can typically access is other nodes on the Supernet. Alternatively, a parameter may be passed into SNlogin 522 that indicates a particular process to be automatically run in a Supernet context. Once a program is running in a Supernet context, all programs spawned by that program also run in the Supernet context, unless explicitly stated otherwise. SNlogout 524 is a script used for logging out of a Supernet. Although both SNlogin 522 and SNlogout 524 are described as being scripts, one skilled in the art will appreciate that their processing may be performed by another form of software. VARPD 526 performs address translation between node IDs and real addresses. KMC 528 is the key management component for each node that receives updates whenever the key for a channel ("the channel key") changes. There is one KMC per node per channel. KMD 530 receives requests from SNSL 542 of the TCP/IP protocol stack 534 when a packet is received and accesses the appropriate KMC for the destination node to retrieve the appropriate key to decrypt the packet. Node A 532 is a Supernet node running in a Supernet context.

TCP/IP protocol stack 534 contains a standard TCP/UDP layer 538, two standard IP layers (an inner IP layer 540 and an outer IP layer 544), and a Supernet security layer (SNSL). 542, acting as the conduit for all Supernet communications. To conserve memory, both inner IP layer 540 and outer IP layer 544 may share the same instance of the code of an IP layer. SNSL 542 performs security functionality as well as address translation. It also caches the most recently used channel keys for ten seconds. Thus, when a channel key is needed, SNSL 542 checks its cache first, and if it is not found, it requests KMD 530 to contact the appropriate KMC to retrieve the appropriate channel key. Two IP layers 540, 544 are used in the TCP/IP protocol stack 534 because both the internal addressing scheme and the external addressing scheme are IP-based. Thus, for example, when a packet is sent, inner IP layer 540 receives the packet from TCP/UDP layer 538 and processes the packet with its node ID address before passing it to the SNSL layer 542, which encrypts it, prepends the real source IP address and the real destination IP address, and then passes the encrypted packet to outer IP layer 544 for sending to the destination.

SNSL 542 utilizes VARPDB 536 to perform address translation. VARPDB stores all of the address mappings encountered thus far by SNSL 542. If SNSL 542 requests a mapping that VARPDB 536 does not have, VARPDB communicates with the VARPD 526 on the local machine to obtain the mapping. VARPD 526 will then contact the VARPD that acts as the server for this particular Supernet to obtain it.

Although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from a network, such as the Internet; or other forms of RAM or ROM either currently known or later developed. Additionally, although a number of the software components are described as being located on the same machine, one skilled in the art will appreciate that these components may be distributed over a number of machines.

Figure 6A:
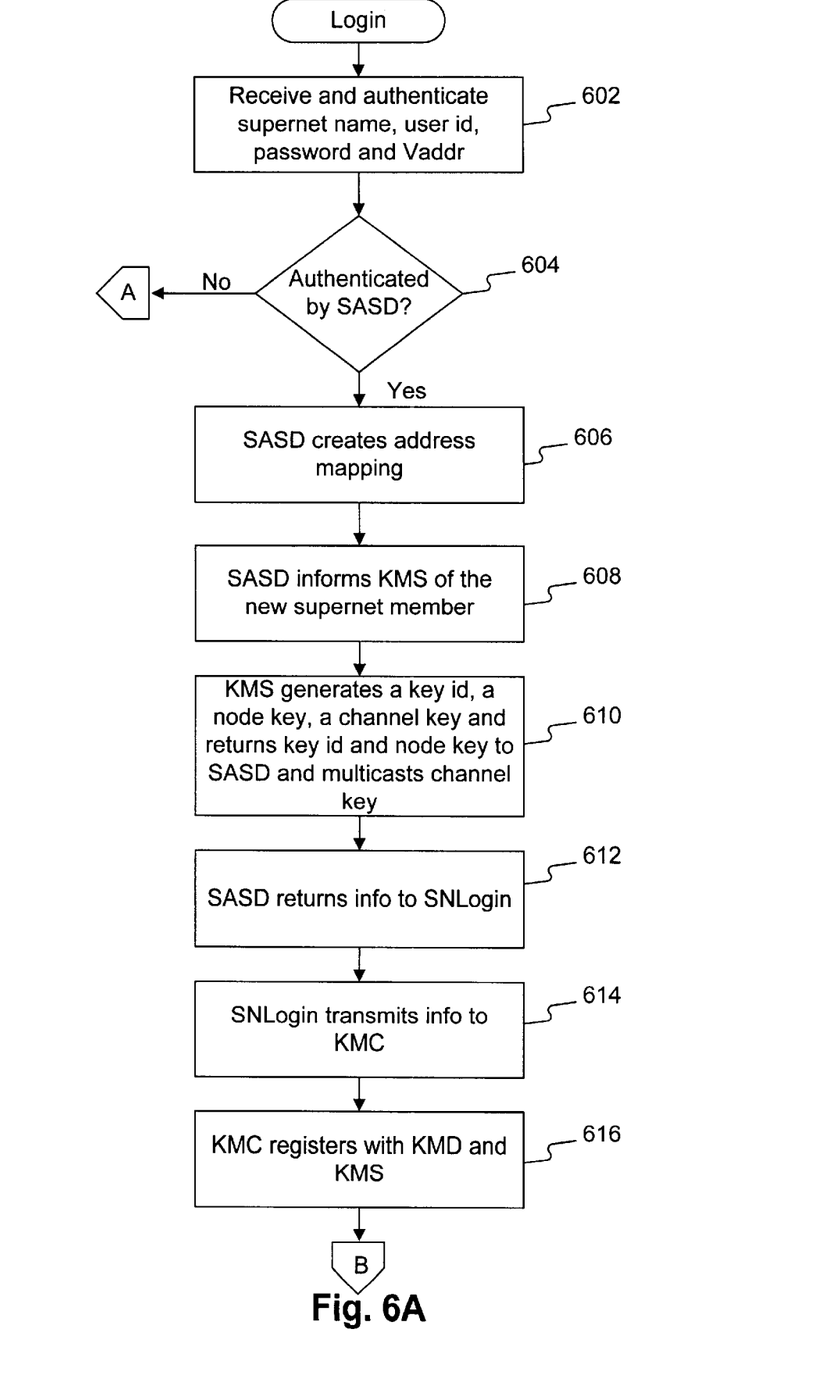
FIGS. 6A and 6B depict a flow chart of the steps performed when a node joins a VPN in a manner consistent with the present invention.
Figure 6B:
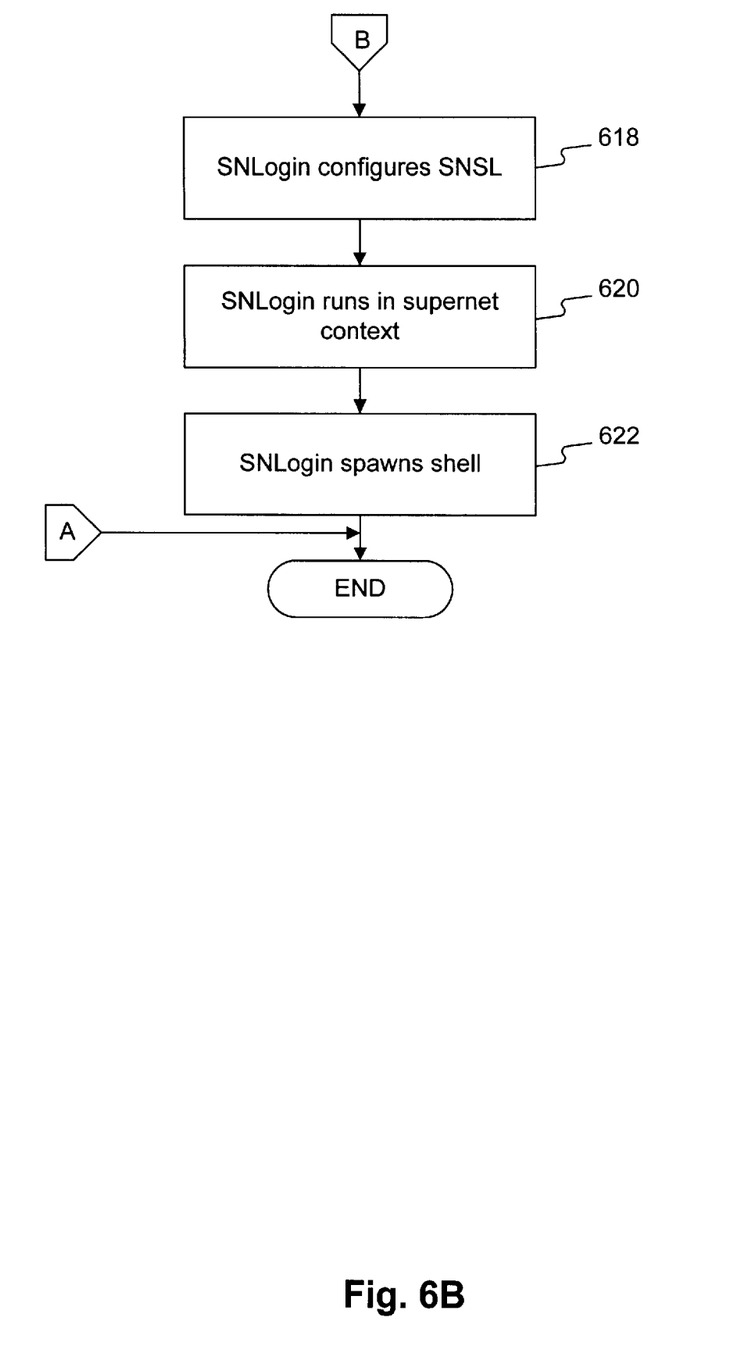

FIGS. 6A and 6B depict a flow chart of the steps performed when a node joins a Supernet. The first step performed is that the user invokes the SNlogin script and enters the Supernet name, their user ID, their password, and a requested virtual address (step 602). Of course, this information depends on the particular authentication mechanism used. Upon receiving this information, the SNlogin script performs a handshaking with SASD to authenticate this information. In this step, the user may request a particular virtual address to be used, or alternatively, the SASD may select one for them. Next, if any of the information in step 602 is not validated by SASD (step 604), processing ends. Otherwise, upon successful authentication, SASD creates an address mapping between a node ID and the real address (step 606). In this step, SASD concatenates the Supernet ID with the virtual address to create the node ID, obtains the real address of the SNlogin script by querying network services in a well-known manner, and then registers this information with the VARPD that acts as the server for this Supernet. This VARPD is identified in the configuration file.

After creating the address mapping, SASD informs the KMS that there is a new Supernet member that has been authenticated and admitted (step 608). In this step, SASD sends the node ID and the real address to KMS who then generates a key ID, a key for use in communicating between the node's KMC and the KMS ("a node key"), and updates the channel key for use in encrypting traffic on this particular channel (step 610). Additionally, KMS sends the key ID and node key to SASD and distributes the channel key to all KMCs on the channel as a new key because a node has just been added to the channel. SASD receives the key ID and the node key from KMS and returns it to SNlogin (step 612). After receiving the key ID and the node key from SASD, SNlogin starts a KMC for this node and transmits to the KMC the node ID, the key ID, the node key, the address of the VARPD that acts as the server for this Supernet, and the address of KMS (step 614). The KMC then registers with the KMD indicating the node it is associated with, and KMC registers with KMS for key updates (step 616). When registering with KMS, KMC provides its address so that it can receive updates to the channel key via the Versakey protocol. The Versakey protocol is described in greater detail in *IEEE Journal on Selected Areas in Communication*, Vol. 17, No. 9, 1999, pp. 1614–1631. After registration, the KMC will receive key updates whenever a channel key changes on one of the channels that the node communicates over.

Next, SNlogin configures SNSL (step 618 in FIG. 6B). In this step, SNlogin indicates which encryption algorithm to use for this channel and which authentication algorithm to use, both of which are received from the configuration file via SASD. SNSL stores this information in an access control list. In accordance with methods and systems consistent with present invention, any of a number of well-known encryption algorithms may be used, including the Data Encryption Standard (DES), Triple-DES, the International Data Encryption Algorithm (IDEA), and the Advanced Encryption Standard (AES). Also, RC2, RC4, and RC5 from RSA Incorporated may be used as well as Blowfish from Counterpane.com. Additionally, in accordance with methods and systems consistent with the present invention, any of a number of well-known authentication algorithms may be used, including Digital Signatures, Kerberos, Secure Socket Layer (SSL), and MD5, which is described in RFC1321 of the Internet Engineering Task Force, April, 1992.

After configuring SNSL, SNlogin invokes an operating system call, SETVIN, to cause the SNlogin script to run in a Supernet context (step 620). In Unix, each process has a data structure known as the "proc structure" that contains the process ID as well as a pointer to a virtual memory description of this process. In accordance with methods and systems consistent with the present invention, the channel IDs indicating the channels over which the process communicates as well as its virtual address for this process are added to this structure. By associating this information with the process, the SNSL layer can enforce that this process runs in a Supernet context. Although methods and systems consistent with the present invention are described as operating in a Unix environment, one skilled in the art will appreciate that such methods and systems can operate in other environments. After the SNlogin script runs in the Supernet context, the SNlogin script spawns a Unix program, such as a Unix shell or a service daemon (step 622). In this step, the SNlogin script spawns a Unix shell from which programs can be run by the user. All of these programs will thus run in the Supernet context until the user runs the SNlogout script.

Figure 7:
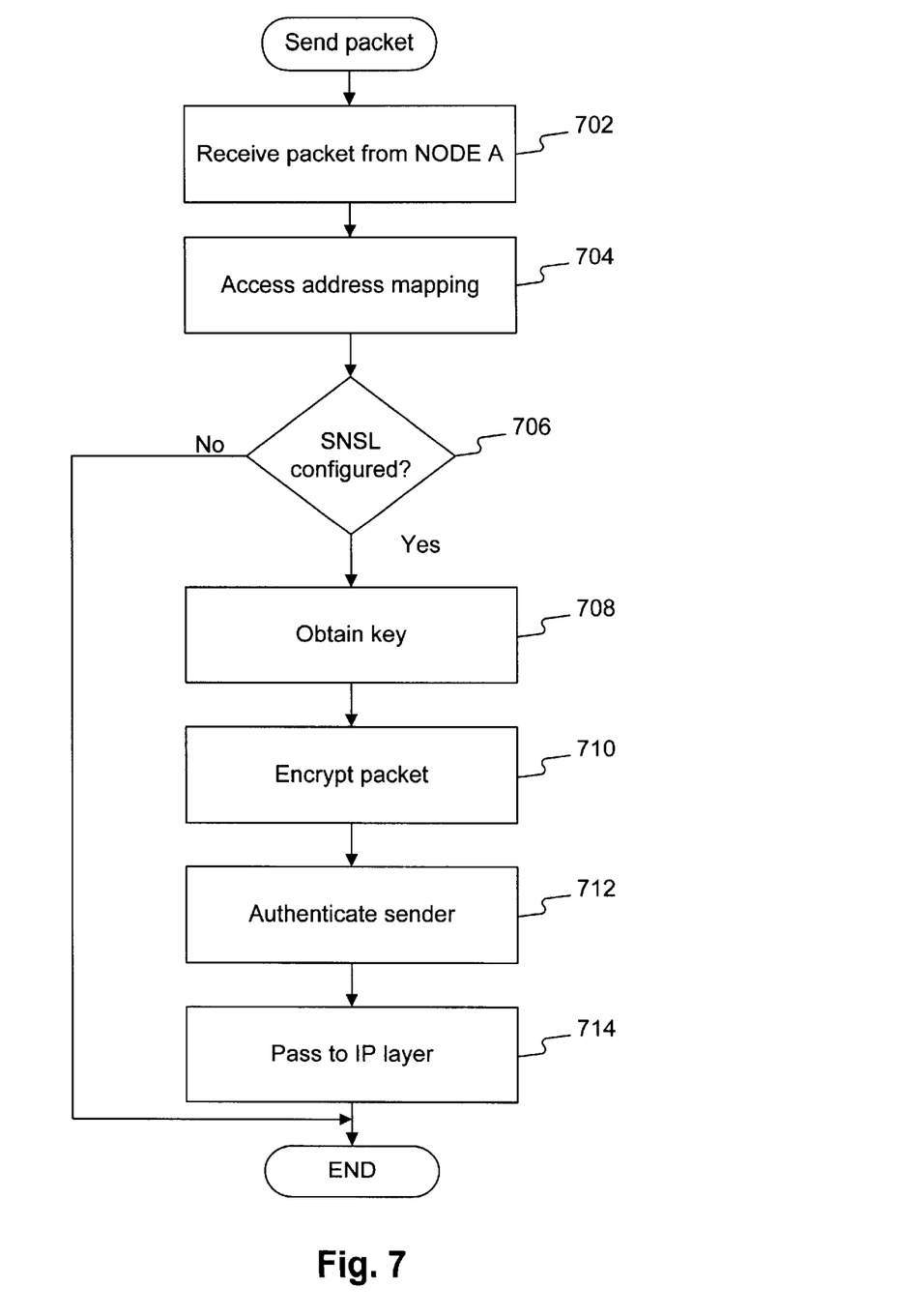
FIG. 7 depicts a flow chart of the steps performed when sending a packet from a node of the VPN in a manner consistent with the present invention.

FIG. 7 depicts a flow chart of the steps performed when sending a packet from node A. Although the steps of the flow chart are described in a particular order, one skilled in the art will appreciate that these steps may be performed in a different order. Additionally, although the SNSL layer is described as performing both authentication and encryption, this processing is policy driven such that either authentication, encryption, both, or neither may be performed. The first step performed is for the SNSL layer to receive a packet originating from node A via the TCP/UDP layer and the inner IP layer (step 702). The packet contains a source node ID, a destination node ID, and data. The SNSL layer then accesses the VARPDB to obtain the address mapping between the source node ID and the source real address as well as the destination node ID and the destination real address (step 704). If they are not contained in the VARPDB because this is the first time a packet has been sent from this node or sent to this destination, the VARPDB accesses the local VARPD to obtain the mapping. When contacted, the VARPD on the local machine contacts the VARPD that acts as the server for the Supernet to obtain the appropriate address mapping.

After obtaining the address mapping, the SNSL layer determines whether it has been configured to communicate over the appropriate channel for this packet (step 706). This configuration occurs when SNlogin runs, and if the SNSL has not been so configured, processing ends. Otherwise, SNSL obtains the channel key to be used for this channel (step 708). The SNSL maintains a local cache of keys and an indication of the channel to which each key is associated. Each channel key is time stamped to expire in ten seconds, although this time is configurable by the administrator. If there is a key located in the cache for this channel, SNSL obtains the key. Otherwise, SNSL accesses KMD which then locates the appropriate channel key from the appropriate KMC. After obtaining the key, the SNSL layer encrypts the packet using the appropriate encryption algorithm and the key previously obtained (step 710). When encrypting the packet, the source node ID, the destination node ID, and the data may be encrypted, but the source and destination real addresses are not, so that the real addresses can be used by the public network infrastructure to send the packet to its destination.

After encrypting the packet, the SNSL layer authenticates the sender to verify that it is the bona fide sender and that the packet was not modified in transit (step 712). In this step, the SNSL layer uses the MD5 authentication protocol, although one skilled in the art will appreciate that other authentication protocols may be used. Next, the SNSL layer passes the packet to the IP layer where it is then sent to the destination node in accordance with known techniques associated with the IP protocol (step 714).

Figure 8:
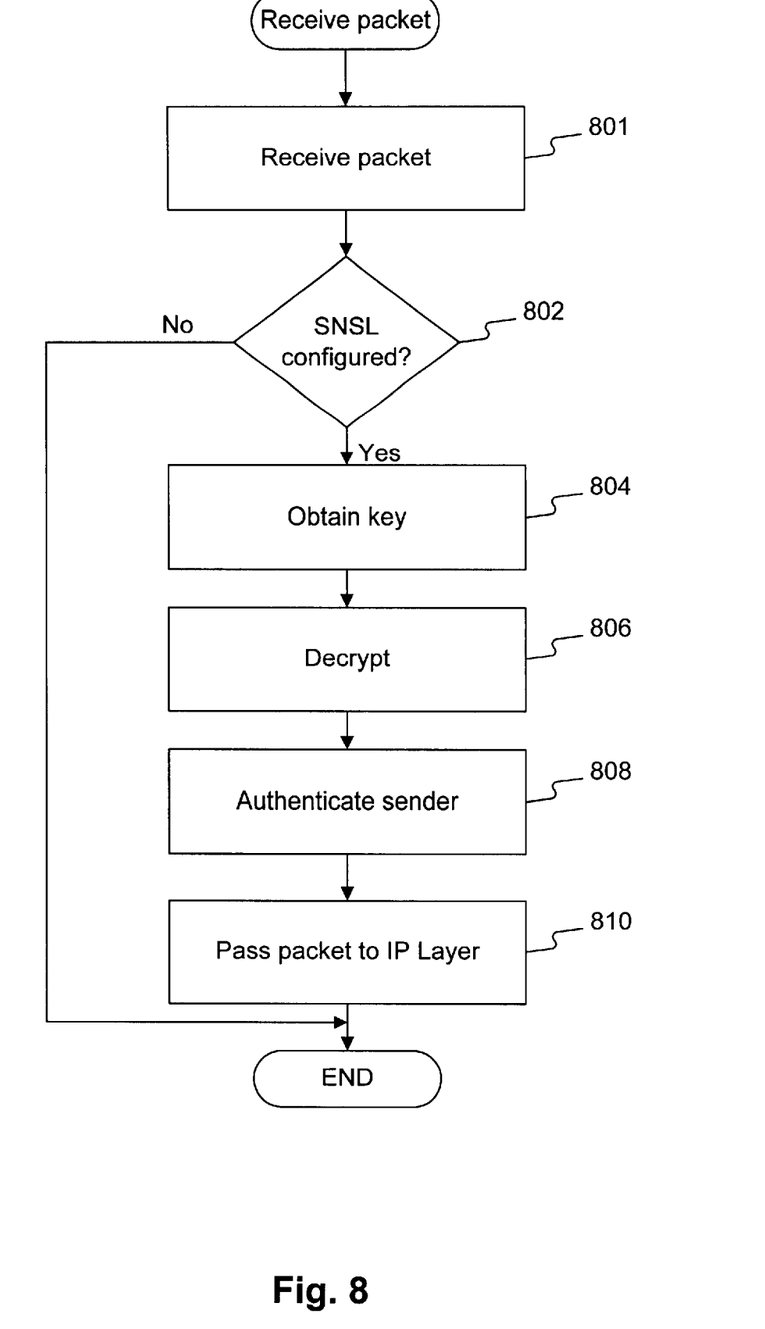
FIG. 8 depicts a flow chart of the steps performed when receiving a packet by a node of the VPN in a manner consistent with the present invention.

FIG. 8 depicts a flow chart of the steps performed by the SNSL layer when it receives a packet. Although the steps of the flow chart are described in a particular order, one skilled in the art will appreciate that these steps may be performed in a different order. Additionally, although the SNSL layer is described as performing both authentication and encryption, this processing is policy driven such that either authentication, encryption, both, or neither may be performed. The first step performed by the SNSL layer is to receive a packet from the network (step 801). This packet contains a real source address and a real destination address that are not encrypted as well as a source node ID, a destination node ID, and data that are encrypted. Then, it determines whether it has been configured to communicate on this channel to the destination node (step 802). If SNSL has not been so configured, processing ends. Otherwise, the SNSL layer obtains the appropriate key as previously described (step 804). It then decrypts the packet using this key and the appropriate encryption algorithm (step 806). After decrypting the packet, the SNSL layer authenticates the sender and validates the integrity of the packet (step 808), and then it passes the packet to the inner IP layer for delivery to the appropriate node (step 810). Upon receiving the packet, the inner IP layer uses the destination node ID to deliver the packet.

Figure 9:
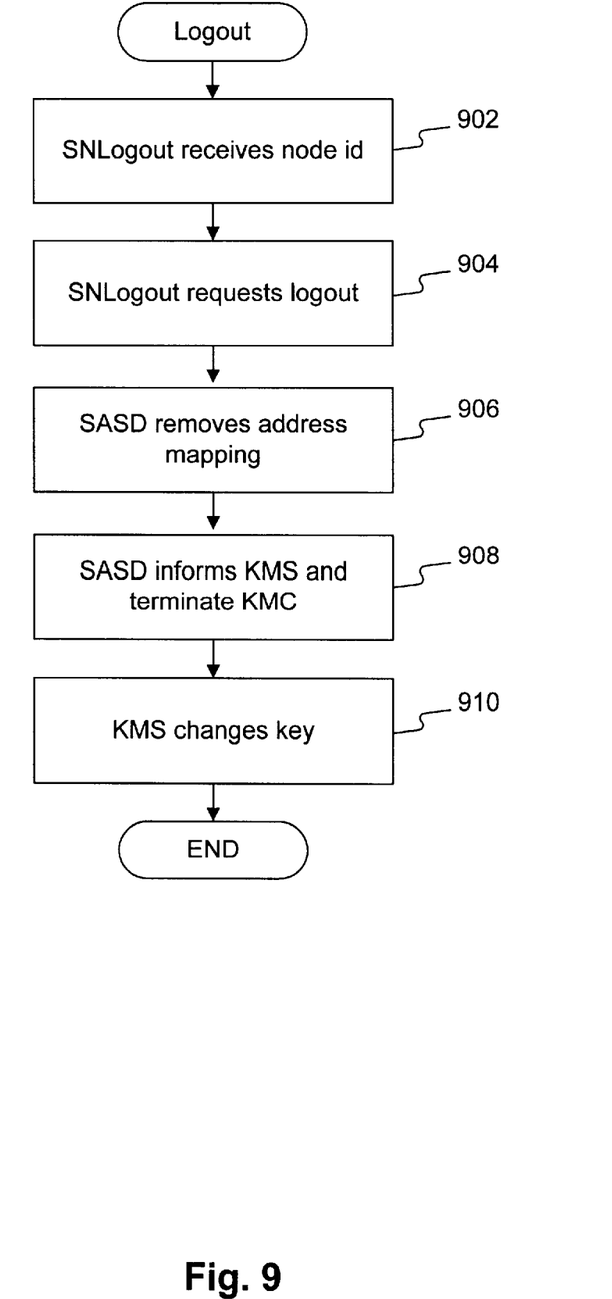
FIG. 9 depicts a flow chart of the steps performed when logging out of a VPN in a manner consistent with the present invention.

FIG. 9 depicts a flow chart of the steps performed when logging a node out of a Supernet. The first step performed is for the user to run the SNlogout script and to enter a node ID (step 902). Next, the SNlogout script requests a log out from SASD (step 904). Upon receiving this request, SASD removes the mapping for this node from the VARPD that acts as the server for the Supernet (step 906). SASD then informs KMS to cancel the registration of the node, and KMS terminates this KMC (step 908). Lastly, KMS generates a new channel key for the channels on which the node was communicating (step 910) to provide greater security.

Although the present invention has been described with reference to a preferred embodiment, those skilled in the art will know of various changes in form and detail which may be made without departing from the spirit and scope of the present invention as defined in the appended claims and their full scope of equivalents.

What is claimed is:

1. In a private network having a source node and a destination node which communicate using a public network infrastructure, a method comprising the steps of:

establishing an address pair for each node of the private network, each address pair including a virtual address within the private network assigned by an authentication module and a real address indicating a physical location associated with each node; and sending a message from the source node to the destination node, including an address pair for the source node, such that a real address of the source node is determinable only by an address resolution module and a real identity of the source node is determinable only by the authentication module.

2. The method of claim 1, wherein the establishing step includes maintaining within the address resolution module information identifying the virtual address and the real address with respect to each node.

3. The method of claim 1, wherein the sending step includes creating a message at the source node including a body and a header wherein the body contains at least a virtual address for the source node.

4. The method of claim 3, wherein the creating step includes providing for the header to contain at least the real address for the source node.

5. The method of claim 1, wherein the sending step includes encrypting at least a portion of the message such that the source node and destination node can be deduced by the address resolution module.

6. The method of claim 1, wherein the sending step includes preserving anonymity of the source node.

7. The method of claim 1, wherein the establishing step includes dynamically assigning the virtual address by the authentication module within the private network.

8. A system comprising:
an establishing module for establishing an address pair for each of a source node and a destination node of a private network,
said nodes of the private network being configured to communicate and share computing resources over a channel through a public network infrastructure, wherein only the source and destination nodes can communicate over said channel, and
each address pair including a virtual address within the private network assigned by an authentication module and a real address associated with the public network infrastructure indicating a physical location associated with each node; and
a sending module for sending a message from the source node to the destination node, including an address pair for the source node, such that the real address of the source node is determinable only by an address resolution module and a real identity of the source node is determinable only by the authentication module.

9. The system of claim 8, wherein the establishing module includes a module to maintain information within the address resolution module identifying the virtual address and the real address with respect to each node.

10. The system of claim 8, wherein the sending module includes a module to create a message at the source node including a body and a header wherein the body contains at least a virtual address for the source node.

11. The system of claim 10, wherein the creating module includes a module to provide for the header to contain at least the real address for the source node.

12. The system of claim 8, wherein the sending module includes a module to encrypt at least a portion of the message such that the source node and destination node can be deduced by the address resolution module.

13. The system of claim 8, wherein the sending module includes a module to preserve anonymity of the source node.

14. The system of claim 8, wherein the establishing module includes a module to dynamically assign a virtual address by the independent address resolution module within the private network.

15. A computer program product comprising:
a computer usable medium having computer readable code embodied therein providing for a private network having a source node and a destination node which communicate and share computing resources over a public network infrastructure, comprising:
an establishing module for establishing an address pair for each node of the private network, each address pair including a virtual address within the private network assigned by an authentication module and a real address associated with the public network infrastructure indicating a physical location associated with each node; and
a sending module for sending a message from the source node to the destination node, including an address pair for the source node, such that the real address of the source node is determinable only by an address resolution module and a real identity of the source node is determinable only by the authentication module.

16. The computer-useable medium of claim 15, wherein the establishing module includes a module to maintain information within the address resolution module identifying the virtual address and the real address with respect to each node.

17. The computer-useable medium of claim 15, wherein the sending module includes a module to create a message at the source node including a body and a header wherein the body contains at least a virtual address for the source node.

18. The computer-useable medium of claim 17, wherein the creating module includes a module to provide for the header to contain at least the real address for the source node.

19. The computer-useable medium of claim 15, wherein the sending module includes a module to encrypt at least a portion of the message such that the source node and destination node can be deduced by the address resolution module.

20. The computer-useable medium of claim 15, wherein the sending module includes a module to preserve anonymity of the source node.

21. The computer-useable medium of claim 15, wherein the establishing module includes a module to dynamically assign the virtual address by the authentication module within the private network.

22. A system comprising:
a private network, with an internal addressing scheme, including a source node and a destination node, wherein said nodes of the private network communicate using a public network infrastructure having a public addressing scheme;
means for establishing an address pair for each node of the private network, each address pair including an internal identifier associated with the internal address scheme and a real address associated with the public address scheme;
means, coupled to the source node, for:
receiving, from the source node, a message including an internal identifier associated with the source node and an internal identifier associated with the destination node,
mapping the internal identifier associated with the source node to the real address of the source node and the internal identifier associated with the destination node to the real address of the destination node, and
transmitting the message over the public network infrastructure for receipt by the destination node using the real address of the destination node; and
means, coupled to the destination node, for receiving the message from the public network infrastructure and delivering the message to the destination node via the internal identifier associated with the destination node.

23. A system comprising:
means for establishing an address pair for each of a source node and a destination node of a private network,
said nodes of the private network being operable to communicate over a channel through a public network infrastructure, and each address pair including a virtual address within the private network and a real address associated with the public network infrastructure; and means for sending a message from the source node to the destination node, including the source node address pair, such that a real address associated with the source node is determinable only by an address resolution module and a real identity of the source node is determinable only by an authentication module.

24. A system comprising:

means for establishing an address pair for each of a source node and a destination node included in a private network having an internal addressing scheme,
said nodes of the private network being operable to communicate using a public network infrastructure having a public addressing scheme, and
each address pair including an internal identifier associated with the internal address scheme and a real address associated with the public address scheme;

means, coupled to the source node, for:
receiving, from the source node, a message including an internal identifier associated with the source node and an internal identifier associated with the destination node,
mapping the internal identifier associated with the source node to the real address of the source node and the internal identifier associated with the destination node to the real address of the destination node, and
transmitting the message over the public network infrastructure for receipt by the destination node using the real address of the destination node; and means, coupled to the destination node, for receiving the message from the public network infrastructure and delivering the message to the destination node via the internal identifier associated with the destination node.

* * * * *